(12) United States Patent
Kolesnik et al.

(10) Patent No.: US 12,019,619 B2
(45) Date of Patent: *Jun. 25, 2024

(54) TIME-TO-RUN COLUMN FOR DATABASE MANAGEMENT SYSTEMS

(71) Applicant: Red Hat, Inc., Raleigh, NC (US)

(72) Inventors: Michael Kolesnik, Raanana (IL); Michel Peterson, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,481

(22) Filed: Jan. 9, 2023

(65) Prior Publication Data
US 2023/0161753 A1 May 25, 2023

Related U.S. Application Data

(63) Continuation of application No. 16/583,062, filed on Sep. 25, 2019, now Pat. No. 11,550,775.

(51) Int. Cl.
*G06F 16/23* (2019.01)
*G06F 16/22* (2019.01)

(52) U.S. Cl.
CPC ........ *G06F 16/2365* (2019.01); *G06F 16/221* (2019.01); *G06F 16/2282* (2019.01); *G06F 16/2358* (2019.01)

(58) Field of Classification Search
None
See application file for complete search history.

(56) References Cited

U.S. PATENT DOCUMENTS

| | | | |
|---|---|---|---|
| 6,763,358 B2 | 7/2004 | Anderson et al. | |
| 7,970,742 B2 | 6/2011 | Hanckel et al. | |
| 8,745,070 B2 | 6/2014 | Krishnamurth et al. | |
| 10,210,175 B2 | 2/2019 | Guo et al. | |
| 2008/0016508 A1 | 1/2008 | Goto et al. | |
| 2018/0007142 A1 | 1/2018 | Raue | |
| 2019/0129893 A1 | 5/2019 | Baird, III | |
| 2021/0089508 A1* | 3/2021 | Laskawiec | G06F 16/215 |

OTHER PUBLICATIONS

Oracle Corporation, Using Database Triggers, Oracle8 Application Developer's Guide, Release 8.0, A58241-01, https://docs.oracle.com/cd/A58617_01/server.804/a58241/ch9.htm, Jun. 28, 2019, 25 pages.

(Continued)

*Primary Examiner* — Amresh Singh
(74) *Attorney, Agent, or Firm* — Womble Bond Dickinson (US) LLP

(57) ABSTRACT

An apparatus and method of performing a time-based operation on a row in a database table includes receiving a function to be applied to a particular row in a table within the database management system. The method may also include, in response to receiving the function, adding a new column to the table. A new cell in the new column includes a timer indicating a time that the processing device will call the function, and the new cell references the function. The method may also include, upon expiration of the timer, determining that the database management system is available for execution of the function, and executing the function on the particular row in the table.

17 Claims, 6 Drawing Sheets

210

| Name | Account Number | ISBN of checked-out book | Phone Number | Address |
|---|---|---|---|---|
| Adrain Owston | 3DGOQ | 9780747532743 | 555-2653 | 91 Oxford Rd |
| Savonne Winter | ZY90B | 9780345803481 | 555-0528 | 40 S. Sleep St. |
| Gaila Hargrave | 33SDJ | 9780316015844 | 555-1903 | 76 N. 81st St. |
| Karin Silver | TEJFL | 8580001038919 | 555-4876 | 933 Wendy Way |
| Millicent Benton | ADZ5F | 9780399590504 | 555-3205 | 7683 Main St. |
| Winston Cooke | RYN67 | 0486406512 | 555-0028 | 400 Mulholland |

211

| Time to Trigger |
|---|
| 2:28:56 |
| 13:12:46 |
| 21:16:44 |
| 0:20:09 |
| 16:04:23 |
| 10:21:33 |

220

| Name | Seat | Amount Paid | No. of Checked Bags | Eligible for Upgrade? |
|---|---|---|---|---|
| Dorotea Morrish | 5A | $211 | 0 | Yes |
| Tamiko Lynwood | 26C | $279 | 1 | No |
| Jerri Jewel | 11B | $299 | 1 | No |
| Jazmine Joiner | 17B | $189 | 2 | Yes |
| Harmonie Kobayashi | 9A | $209 | 1 | No |
| Shana Odell | 15C | $233 | 2 | Yes |

221

| Time to Trigger |
|---|
| 4:12:26 |
| 4:12:26 |
| 4:12:26 |
| 4:12:26 |
| 4:12:26 |
| 4:12:26 |

(56) References Cited

OTHER PUBLICATIONS

IBM, Create Trigger, https://www.ibm.com/support/knowledgecenter/en/ssw_ibm_i_74/db2/rbafzhctrigger.htm, 18 pages.
Microsoft Corporation, Create DML Triggers to Handle Multiple Rows of Data, https://docs.microsoft.com/en-us/sql/relational databases/triggers/create-dml-triggers-to-handle-multiple-rows-of-data?view=sql-server-2017, Mar. 14, 2017, 4 pages.

* cited by examiner

TIME-TO-RUN COLUMN FOR DATABASE MANAGEMENT SYSTEMS

RELATED APPLICATIONS

This application is a continuation of U.S. patent application Ser. No. 16/583,062, filed on Sep. 25, 2019, which is herein incorporated by reference in its entirety.

TECHNICAL FIELD

Aspects of the present disclosure relate to database management systems.

BACKGROUND

A database management system (DBMS) is computer software that stores data and provides software routines for manipulating the stored data. A DBMS may be used directly (i.e., by human users), as a component of another software package, or to provide service to another software package.

A database is a collection of data which is stored and managed electronically in a computer system. A database is usually controlled as a unit by a DBMS. A "relational database" is a database which contains tables that are used to store sets of data and to specify relationships between the different sets of data stored in the database. Data within most common types of databases in operation today is typically modeled in rows and columns in a series of tables to make processing and data querying efficient. The data can then be accessed, managed, modified, updated, controlled, and organized. Most databases use structured query language (SQL) for writing and querying data. Typically, databases are used to store sets of related data. For example, a database may be used to store all the seat reservations made by the customers of an airline, plus information about the airplane (e.g., seating chart information), information about the customers (e.g., address, credit card used to purchase tickets), and other related information.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
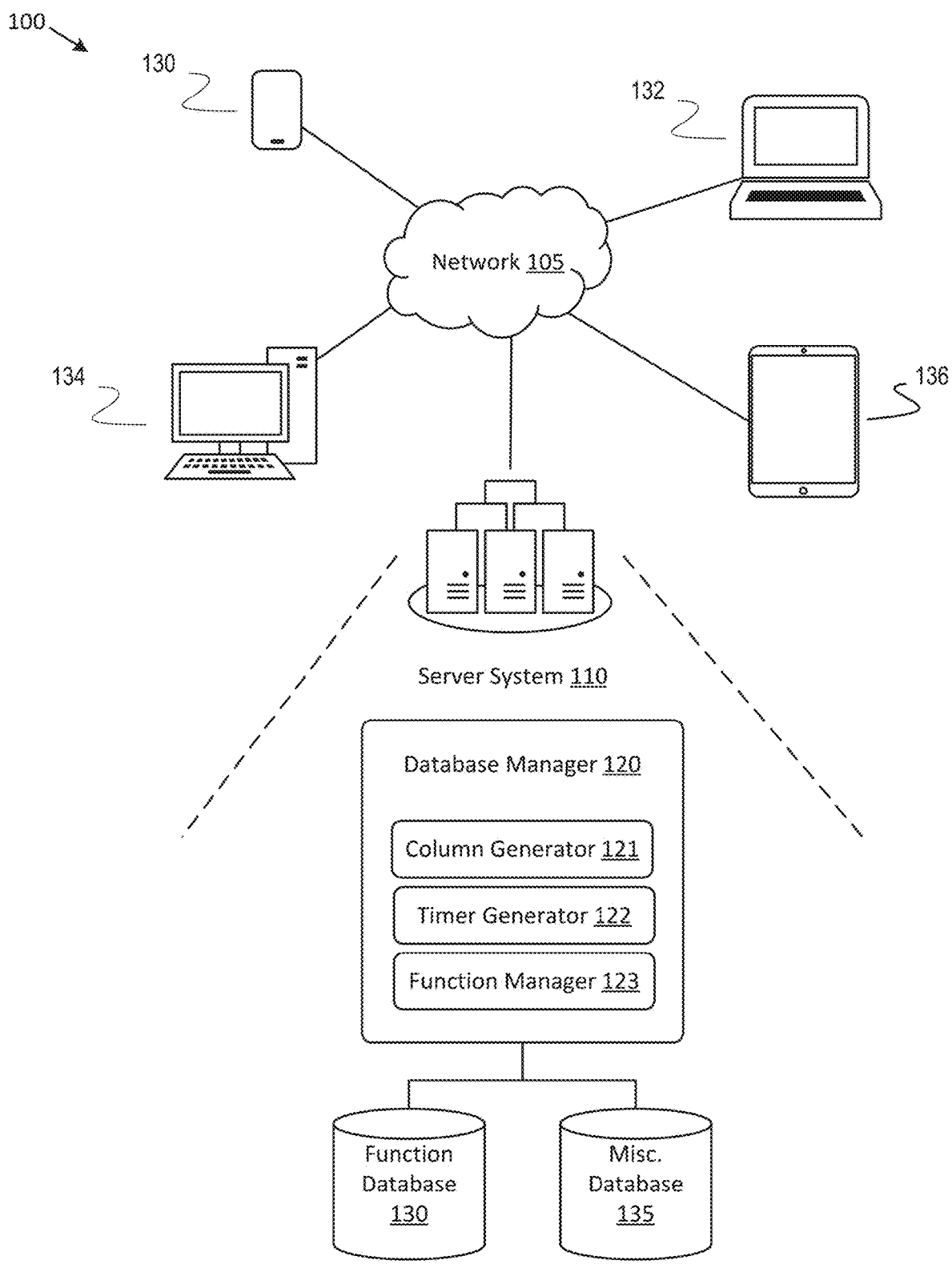
FIG. 1 is a block diagram of an example network environment for an example database management system with a time-to-trigger column generator.

In database management systems, there is often no way to indicate whether rows need to be retained indefinitely or not. This means that some data in the database may remain in the database indefinitely. This could have a negative impact on the performance of the database. It is often not necessary to store all data indefinitely. It may be appropriate for some data to be deleted or archived after some amount of time has passed. Examples of data that may be safely deleted or archived include data used for temporary calculations and activity logs.

A new column may be added to a database table that specifies when a predetermined operation may be performed on a corresponding row in the table. The column may be referred to as a "time-to-trigger" column. The column may include several cells, each cell corresponding to a particular row. The cell for a given row in the "time-to-trigger" column may contain a timer. The timer may be set to expire after a set amount of time. When the timer expires, a particular function may be called. The function may have been predetermined by an administrator of the database. The function may be any function a programmer desires to be called on the row. For example, the function may be to delete the contents of the row, or the function may be may be to archive the contents of the row, or to remind a database administrator (e.g., via an email) to check on the row's contents, or any other suitable function. Triggering the function may cause the function to be performed. Note that this disclosure uses the terms "time-to-run" and "time-to-trigger" interchangeably. Both terms refer to an amount of time until a particular function is to be called.

In some embodiments, the expiration of the timer may not guarantee that the function will be called. At times, the database may be down for maintenance, may be unexpectedly shut down, may be under particularly stressful performance constraints, or may be otherwise unable to perform the function at the exact moment the timer expires. In such cases, the function may be called when it becomes feasible to do so.

In particular embodiments, the method performed by a processing device may be as follows: the processing device may receive, from a user of a database management system, a function to be applied to a particular row in a table within the database management system. In response to receiving the function, the processing device may add a new column to the table (e.g., a "time-to-trigger" column") wherein a new cell in the new column comprises a timer indicating a time that the processing device will call the function, and wherein the new cell references the function. Upon expiration of the timer, the processing device may determine that the database management system is available for execution of the function. Finally, the processing device may execute the function on the particular row in the table. As an example and not by way of limitation, a table may exist in a database that contains seat reservations made by the customers of an airline for an upcoming flight, plus information about the airplane (e.g., seating chart information), information about the customers (e.g., address, credit card used to purchase tickets, and travel agent). The table may be relevant up until the time of the flight. Once the flight has occurred, the table may not be needed any longer and may be deleted, archived, or moved to long-term storage. A time-to-trigger column may be added to the table. The time-to-trigger column may contain a timer that is set to expire when the flight is scheduled to take place. For example, if the flight is scheduled to take place in four days, twelve hours, and twenty-six minutes, the cells in the time-to-trigger column may state "4:12:26." The time-to-trigger column may also be associated with a particular function that has been programmed or otherwise determined by a database administrator. The function may be, for example, computer instructions to move the table from one database to another database. The function may likewise be any other suitable function or combination of functions such as, for example, instructions to compress the table and then to move the table to another storage location.

FIG. 1 is a block diagram of an example network environment for an example database management system with a time-to-trigger column generator, in accordance with some embodiments of the present disclosure. A server system 110 provides functionality for collecting and processing data from client devices 130-136. The server system 110 includes software components that can be deployed at one or more data centers in one or more geographic locations, for example. The server system 110 may be, include, or use a database management system. A database manager 120 may include software components that perform operations on or in association with one or more databases. The database manager 120 may include a column generator 121, a timer generator 122, and a function manager 123. The software components can include subcomponents that can execute on the same or on different individual data processing apparatus.

An application, such as a web-based application, can be provided as an end-user application to allow users to interact with the server system 110. The client application or components thereof can be accessed through a network 105 (e.g., the Internet) by users of client devices, such as a smart phone 130, a laptop computer 132, a personal computer 134, and a tablet computer 136. Other client devices are possible. Additionally or alternatively, software components for the network environment 100 (e.g., database manager 120, column generator 121, timer generator 122, and function manager 123) or any portions thereof can reside on or be used to perform operations on one or more client devices. In particular embodiments, the database manager 120 may access a function database 130 which may include one or more stored functions that a database administrator may select. For example, the function database 130 may include a delete function, a compress function, a move function, a remind function, an archive function, or any other suitable function. In some embodiments, a remind function may include instructions to send a reminder to a user via any suitable communication means (e.g., email, text, a web application) when the timer expires. Another example of a function may be a summary function, which provides a summary of all the actions that has been performed on the table or on a segment of the table. In some embodiments, the database manager 120 may access miscellaneous database 135, which may contain any suitable data. In addition or alternatively, an administrator of the database may create her own function or combination of functions using any suitable programming language. This function or functions may be added to the function database 130 for future use. In particular embodiments, column generator 121 may generate the time-to-trigger columns as directed by a database administrator. The column generator 121 may ensure that the time-to-trigger column contains an appropriate number of rows for the column's respective table. For example, if a table has 1,370 rows, the column generator 121 may generate a time-to-trigger column that contains 1,370 rows as well. The column generator 121 may also be responsible for appending the time-to-trigger column to the appropriate table in the database. Alternatively, the time-to-trigger column may be stored as metadata for the row itself and not as part of the table's contents. Example code for how an administrator may create a column in a table may be:

CREATE TABLE logs
id INT(10) NOT NULL AUTO_INCREMENT,
data VARCHAR (2000),
archive_after TIMETORUN FUNCTION archive_log);

In the above sample code, the database function "archive_log" may receive the row as the variable and may for example insert of copy of the row into an archive table, and then delete the original row. This may be one function (e.g., an archive/delete function) or two separate functions (e.g., a first archive function, and a second delete function).

In particular embodiments, the database manager 120 may ensure that the rows whose time-to-trigger cells have expired are executed upon in an appropriate amount of time. This may be accomplished by generating an index on the column to improve the performance of finding the rows. The index itself may be any suitable index set up in any suitable manner. As an example and not by way of limitation, a database index may a data structure that improves the speed of data retrieval operations on a database table at the cost of additional writes and storage space to maintain the index data structure. Indexes are used to quickly locate data without having to search every row in a database table every time a database table is accessed. Indexes can be created using one or more columns of a database table, providing the basis for both rapid random lookups and efficient access of ordered records. An index is a copy of selected columns of data from a table that can be searched very efficiently that also includes a low-level disk block address or direct link to the complete row of data it was copied from. Some databases extend the power of indexing by letting developers create indexes on functions or expressions. For example, an index for an airline company could be created on last_name, which would store the last_name field of the airline customers in the index. This would allow the database manager 120 to quickly search a table of airline customers by last name and then locate their corresponding row in the table.

In particular embodiments, the database manager 120 may check periodically to determine which timers have expired. This may be performed instead of reacting to every timer that has expired. For example, the database manager 120 may check every other day for any timers that have expired and may perform the operations specified in each function corresponding to the expired timers. This may be done to save computing resources. For example, this may be performed at night when there is relatively low load on the database management system.

In particular embodiments, the database manager 120 may access a database and perform similar processes as those mentioned herein, with the exception that the database manager 120 may not alter any tables within the database. Instead, the database manager 120 may access one or more tables within a database and, when generating a new time-to-trigger column, may associate each table with the appropriate time-to-trigger column and store this time-to-trigger column separately from the table.

Figure 2:
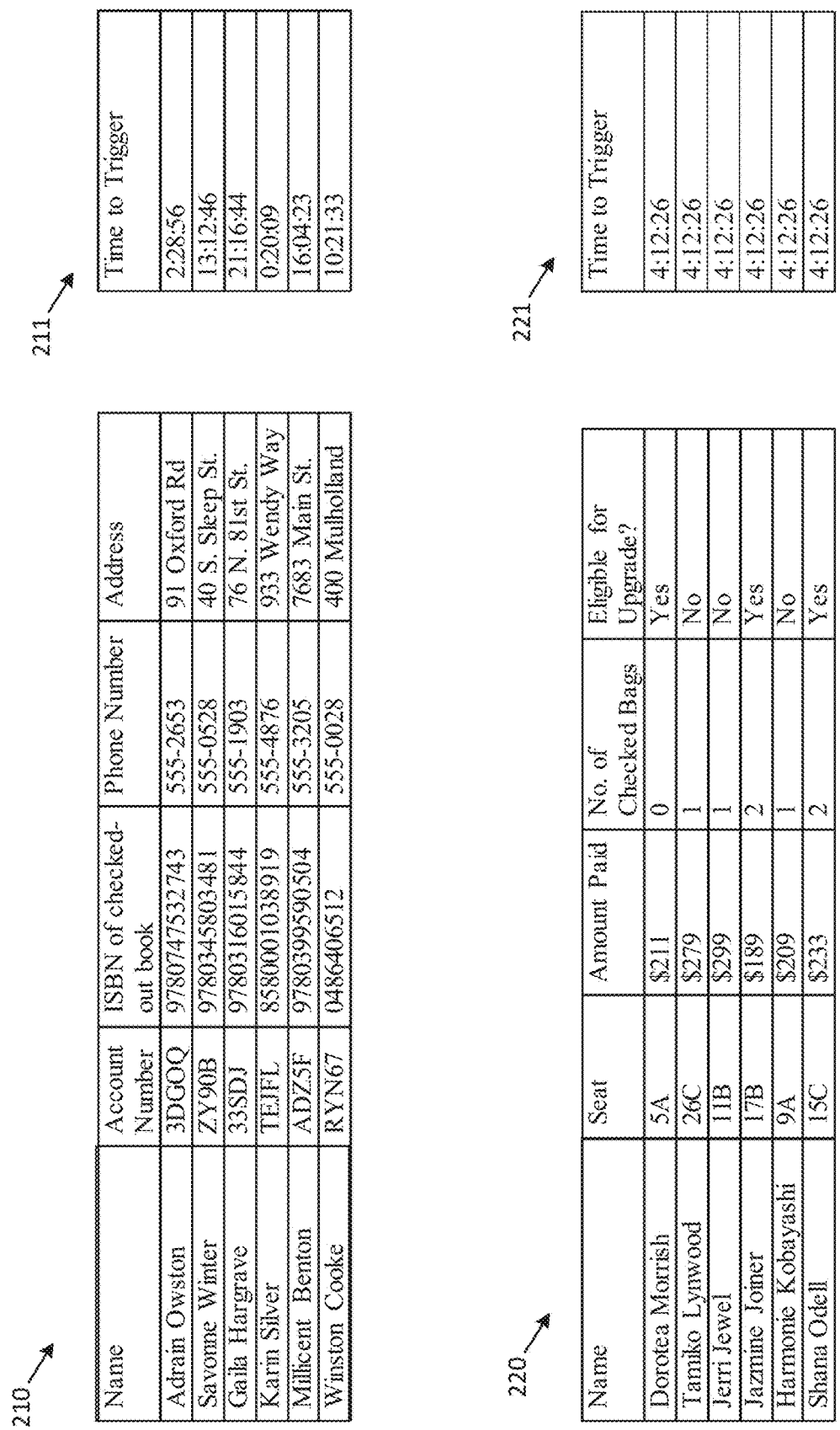
FIG. 2 illustrates two example tables and two example time-to-trigger columns.

FIG. 2 illustrates two example tables 210 and 220 and two example time-to-trigger columns 211 and 221. Table 210 illustrates an example table that may be created for an example business need. Table 210 may have any number of columns and any number of rows. Column titles (e.g., columns 211 and 211) may be any suitable title that the table creator chooses. The type of column 211 and column 221 may be a "time to trigger," and the name may be subject to whomever generates the table. For example, a public library may need a way to track its members and which members have checked out books, the ISBN number of each checked-out book, information about the member, and the due date of each checked-out book. Thus, table 210 may be a table that is generated in association with a public library. Table 210 may contain any suitable number of columns, including, in place of, or in addition to the columns illustrated in FIG. 2. For example, table 210 may include a column for each of the following categories of information: name, account number, ISBN of checked-out book, phone number of library member, and the address of the member. Column 211 may be a time-to-trigger column that may have one or more different timers for each row in the column. In this example, the time-to-trigger column may have cells each containing a single timer that corresponds with each member in the table. The timers may all have different values, where each value indicates how much time will elapse before the timer expires. The expiration of the timer may cause the database manager 120 to call any suitable function as specified by a database administrator or as specified by one or more default settings within the database management system. As an example and not by way of limitation, the time-to-trigger for "Adrain Owston" may state "2:28:56," which may represent that the timer will expire in two hours, twenty-eight minutes, and fifty-six seconds. At the expiration of the timer, the function may be called. The function may be to remind Adrain via and email or automated phone call of an impending due date for the library book he has checked out. All the timers in the time-to-trigger column 211 may be different, which may reflect the different times each user checked out a library book.

Table 220 may be a table that is generated in association with an upcoming flight for a particular airline. Table 220 may contain any suitable number of columns, including, in place of, or in addition to the columns illustrated in FIG. 2. For example, table 220 may include the following information for an upcoming flight with a particular airline: name of passenger, seat number, amount the passenger paid for the seat on the flight, the number of checked bags, and an indication of whether or not the passenger is eligible for a seat upgrade. These indications are illustrated as "yes" or "no," indications, but "1" or "0" may be used in place of words. For example a "1" may indicate that the passenger is eligible for a seat upgrade and a "0" may indicate that the passenger is not eligible for a seat upgrade. In this example, time-to-trigger column 221 may contain timers that each have the same expiration date. This may be for any suitable business or technical reasons. For example, at the expiration of the timers, the function that is called may be to update all the cells in the "Eligible for Upgrade?" column to "no." This could be, for example, because passengers are only eligible for an upgrade up to twenty-four hours before the flight is scheduled to depart. Thus, once a certain time until the flight has passed (e.g., 24 hours before), no passenger is eligible for an upgrade and thus all the cells in the column are updated to "no." In particular embodiments, the function may be applied to a group of rows. Alternatively, the function may operate on a batch of rows whose respective timers have expired. This may be the case in the example illustrated in table 220. The database administrator may write a single function to update all the cells in the "Eligible for Upgrade?" column and select to apply it to every row in the table, such that when the timer expires for each row, the function may be called.

In particular embodiments, multiple functions may be applied to a single row and each function may have its own independent timer. For example, a new cell in the time-to-trigger column may have a first timer and a second timer and may reference a first function and a second function. The first timer may indicate a time to call the first function and the second timer may indicate a time to call the second function. For example, the first timer may be set to expire in three days and may be associated with an archive function. The second timer may be set to expire in four days and may be associated with a delete function. At the expiration of the first timer, the database manager 120 may archive the contents in the row corresponding to the new cell, given that the database is available for execution of such a function. At the expiration of the second timer, the database manager 120 may delete the contents in the row corresponding to the new cell, given that the database is available for execution of such a function. Alternatively, it may be desirable for each function and corresponding timer to be contained in its own cell. In this case, a row in a database may have multiple time-to-trigger columns, where each cell includes a single function and a single timer. For example, table 210 may include a first Time to Trigger column 211 and a second Time to Trigger column (not illustrated). The first Timer to Trigger column 211 may include a first timer and a first function, and the second Timer to Trigger column may include a second timer and a second function. In embodiments, the first timer and the second time may be set such that the second timer expires after the first timer. To continue the example of checked-out library books, the first function may be to send an email to remind customers that their library book will be due in three days. The second function may be to apply a late fee to the customer's account if the library book has not been returned by the time the second timer expires. The first timer may be set to expire three days before the due date of the library book. The second timer may be set to expire on the due date of the library book.

Figure 3:
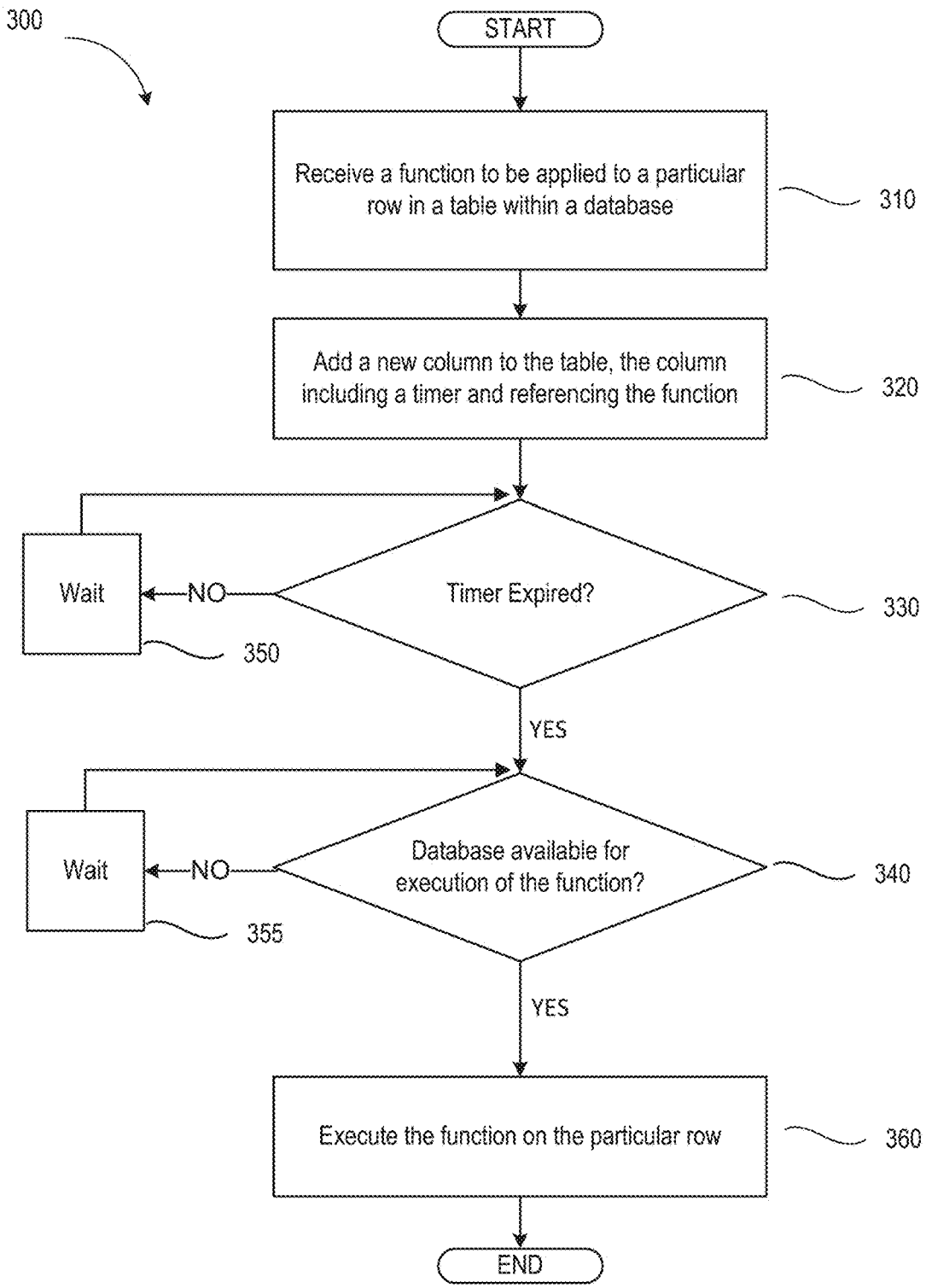
FIG. 3 is a flow diagram that illustrates an example method for implementing a time-to-trigger column in a table within a database.

FIG. 3 is a flow diagram that illustrates an example method 300 for implementing a time-to-trigger column in a table within a database. As discussed herein, at the expiration of the timer, the database manager 120 may not immediately call the function that is programmed to be performed. The database manager may first check whether the database is available to perform the function. Reasons the database may be unavailable include any suitable reason, including the system is under an exceptional amount of load (e.g., because many users are currently querying the database and it is operating at a high capacity), the database is down for scheduled or unscheduled maintenance, or the database has unexpectedly shut down (e.g., due to a power outage). This process may be performed to ensure that the database management system performs in an expected manner, for example by prioritizing user queries above time-based row operations. In general, the method 300 may be performed by processing logic that may include hardware (e.g., processing device implementing the database manager 120, circuitry, dedicated logic, programmable logic, microcode, hardware of a device, integrated circuit, etc.), software (e.g., instructions run or executed on a processing device), or a combination thereof.

The method 300 may begin at step 310, where the processing logic receives a function to be applied to a particular row in a table within a database. As an example, the table may be a list of financial transactions that have been performed by many different customers using a particular credit card. The data within the table may be owned by a credit card company operating the credit card. The table may include columns that contain the following information: name of consumer, name of merchant where the transaction occurred, amount paid during the transaction, date of the transaction, and the running balance on the credit card. An administrator of the database (e.g., an employee of the credit card company) may decide that all transactions that are older than 14 days should be moved compressed and moved to elsewhere in the database (e.g., archived), and then deleted from the original table. The administrator may generate several functions as follows: an extraction function to extract the rows that are older than 14 days, a compression function to compress those rows, a move function to move the compressed rows elsewhere in the database, and, if necessary, a delete function to delete the extracted rows from the original table. The administrator may send this to the processing logic; thus, the processing logic may receive a function or more than one function.

At step 320 the processing logic may add a new column to the table, where the column includes a timer and also references the received function(s). As discussed herein, the new column may be generated and stored elsewhere so as to avoid interfering with the contents of the table, or the column may be added to the table and stored as part of the table's contents. As an example of step 320, a new column may be added to the financial transaction table discussed above that is a time-to-trigger column. Each cell in the column may be a timer that is set to expire in fourteen days from the date of the transaction. At step 330, the processing logic may check to see if any timers have expired. Alternatively, the processing logic may receive an indication that a timer has expired. This disclosure contemplates both scenarios. If the first scenario, the processing logic may periodically check to see whether the any timers in the table or tables have expired, and if so, proceed to the next steps in the process. If not, the processing logic may proceed to step 350 and wait until the next period to check to see if any timers have expired. The period may be any suitable period such as daily, every other day, weekly, etc.

If the timer has expired, the processing logic may proceed to step 340, where the processing logic may check to see if the database is available for execution of the function. As discussed herein, there may be times when the database is unavailable to perform extra operations, such as when there is a high load placed on the system. For example, many different users may be querying the database simultaneously, and additional operations (e.g., operations performing the functions discussed herein) may slow down the processing to an undesirable rate. If this is the case, the processing logic may proceed to step 355 and may wait until the load on the database is low enough to be able to perform the function without negatively affecting the performance of the system. This may be specified by an administrator as a predetermined threshold processing level. Thus, determining that the database management system is available for execution of the function includes determining that operating resources of the database management system are operating below a threshold level of operation. Likewise, determining that the database management system is available for execution of the function may include determining that the database management system is, at a time the timer expires, free from scheduled or unscheduled maintenance. If the database is available for execution of the function (e.g., operating resources are below a threshold level, no scheduled or unscheduled maintenance), the processing logic may proceed to step 360, where it may execute the function on the particular row that corresponds to the cell referencing the function. For example, referring back to the functions discussed above for the transaction database, if the database is available, the processing device may perform the following functions: a compression function to compress those rows, a move function to move the compressed rows elsewhere in the database, and, if necessary, a delete function to delete the extracted rows from the original table.

Although the method steps of FIG. 3 are illustrated and discussed as occurring in a particular order, the method steps discussed herein may occur in any suitable order. For example, the processing logic may generate a new time-to-trigger column before receiving the function. Other method steps are also contemplated herein. As an example, the processing logic may generate a new time-to-trigger column and then may send an administrator of the database a request to add one or more functions to the column as well as one or more timers for each function or row. The user may then input one or more desired functions and associated timers for one or more rows of the table.

Figure 4:
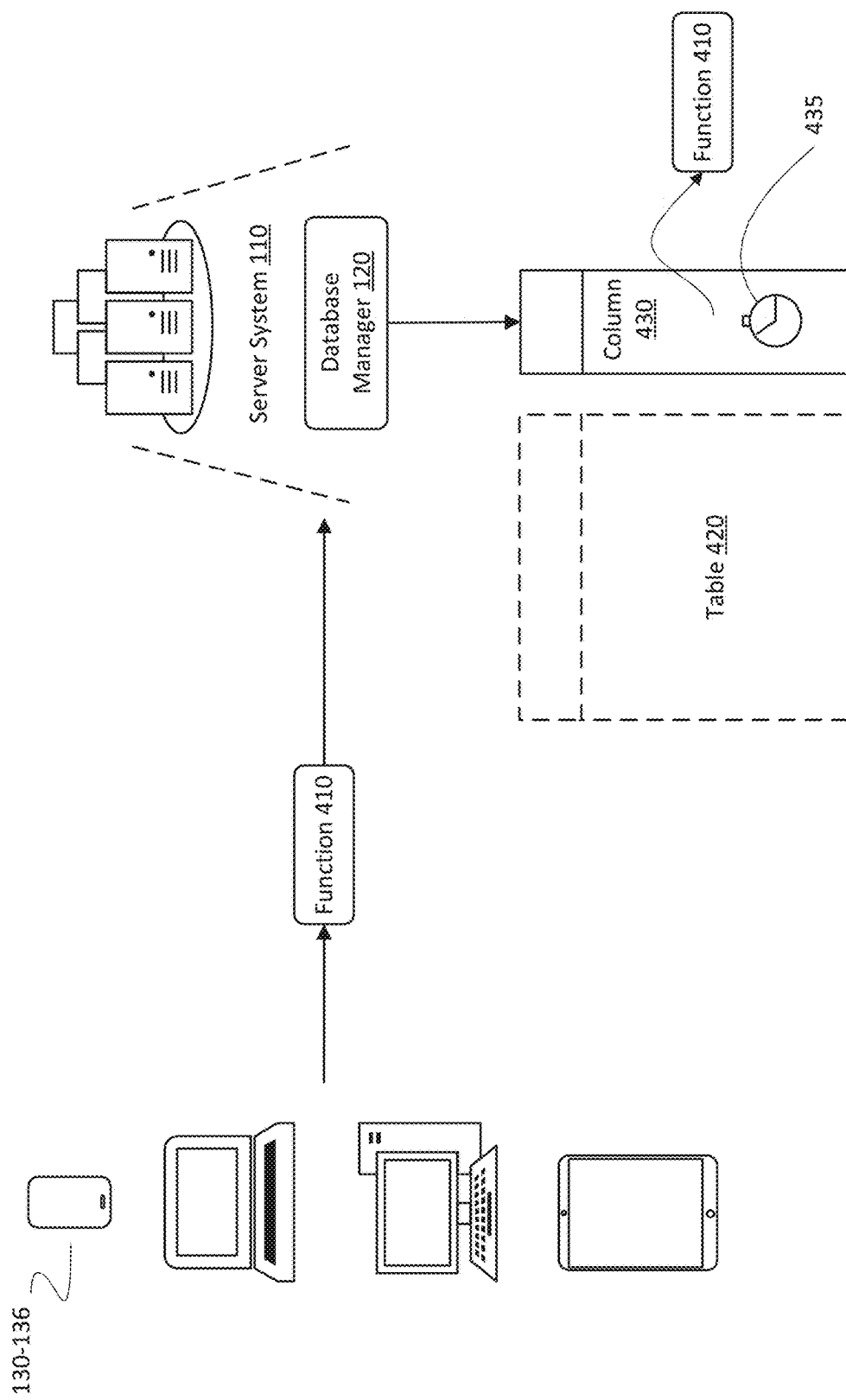
FIG. 4 is a block diagram that illustrates an example flow for adding a time-to-trigger column in a table within a database.

FIG. 4 is a block diagram that illustrates an example flow for adding a time-to-trigger column in a table within a database. This figure illustrates many of the same concepts discussed with reference to FIGS. 1-3. The server system 110 and specifically the database manager 120 may receive a function 410 from a client device 130-136. The function 410 may be any suitable function as discussed herein. The function may be intended to be applied to a particular row in a table 420. For example, the function may be intended to alter one or more cells in the particular row. Upon receiving the function 410, the database manager may create a new column 430. The column 430 may be a "time-to-trigger" column. The column 430 may contain a timer 435 and may reference the function 410. The function 410 may be stored along with the contents of the table 420 or may be stored in a separate location, such as function database 130. The timer 435 may indicate a time when the database manager 120 is set to call the function 410. The timer 435 may either be a countdown timer, or may indicate a date and optionally a time when the database manager will call the function 410.

Figure 5:
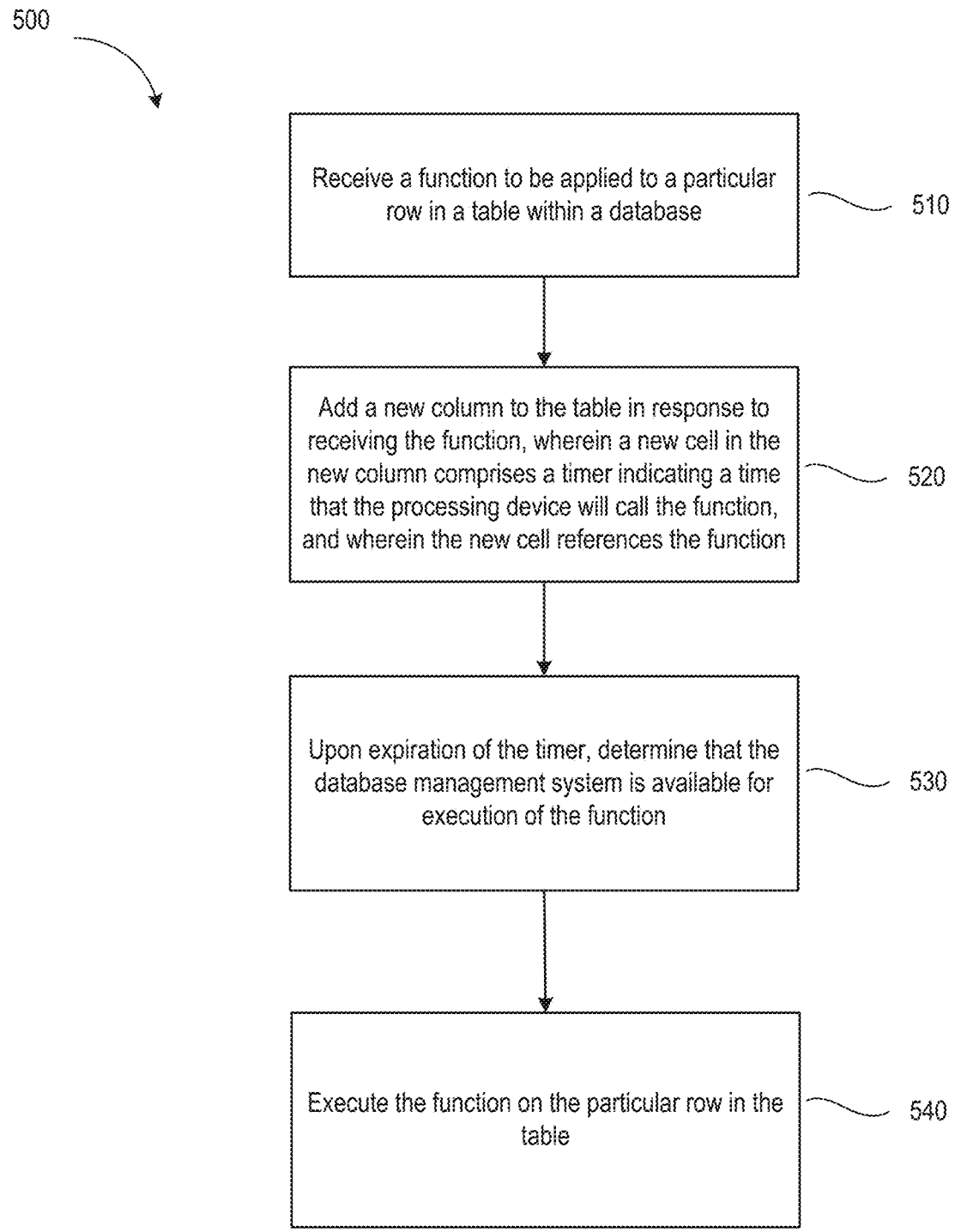
FIG. 5 is a flow diagram that illustrates an example system for implementing a time-to-trigger column in a table within a database.

FIG. 5 is a flow diagram 500 that illustrates an example method for implementing a time-to-trigger column in a table within a database as implemented by an example system. The system that implements the time-to-trigger column may be server system 110. Server system 110 may provides functionality for collecting and processing data from client devices 130-136. The server system 110 includes software components that can be deployed at one or more data centers in one or more geographic locations, for example. The server system 110 may be, include, or use the database management system 120 that performs operations on or in association with one or more databases. The database manager 120 may include a column generator 121, a timer generator 122, and a function manager 123. These components may provide the functionality discussed herein. The flow diagram 500 may begin at step 510, where the server system 110 receives a function to be applied to a particular row in a table within a database. At step 520, the server system 110 may add a new column to the table in response to receiving the function, wherein a new cell in the new column comprises a timer indicating a time that the processing device will call the function, and wherein the new cell references the function. At step 530, the server system 110 may, upon expiration of the timer, determine that the database management system is available for execution of the function. At step 540, the server system 110 may execute the function on the particular row in the table. Each of these steps may be accomplished using the functionality and methods discussed herein. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
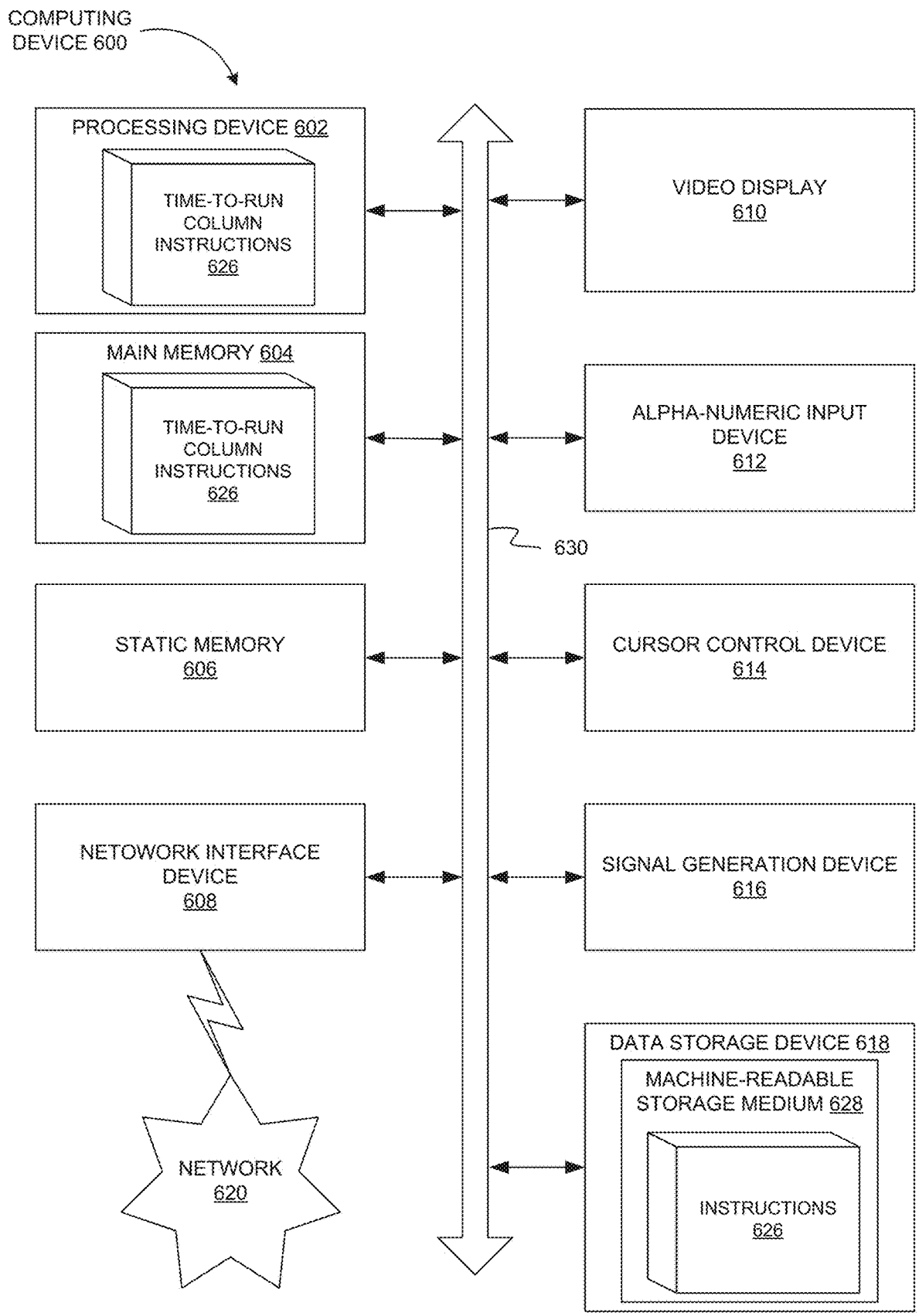
FIG. 6 is a block diagram of an example computing device that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein. In one embodiment, processing device 602 represents processing device 120 of FIG. 1. In another embodiment, processing device 602 represents a processing device of a client device (e.g., client devices 130-136 of FIG. 1).

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions, e.g., instructions for carrying out the operations described herein, in accordance with one or more aspects of the present disclosure. Time-to-run column instructions 626 may also reside, completely or at least partially, within main memory 604 and/or within processing device 602 during execution thereof by computing device 600, main memory 604 and processing device 602 also constituting computer-readable media. The instructions may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "determining," "encoding," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   receiving a function to be applied in association with a particular row in a table within the database management system;
   adding, by a processing device, a new column to the table in response to receiving the function, wherein a new cell in the new column comprises a timer indicating a time that the processing device will call the function, and wherein the new cell references the function;
   upon expiration of the timer, determining that the database management system is available for execution of the function based on operating resources of the database management system; and
   executing the function on the particular row in the table by sending a notification to a client device that the information in the particular row requires one or more actions.

2. The method of claim 1, wherein the function comprises instructions to delete, archive, move, or compress information in the particular row.

3. The method of claim 1, wherein the function is to operate on a batch of rows whose respective timers have expired.

4. The method of claim 1, wherein determining that the database management system is available for execution of the function comprises determining that the operating resources of the database management system are operating below a threshold level of operation.

5. The method of claim 4, wherein determining that the database management system is available for execution of the function further comprises determining that the database management system is, at a time the timer expires, free from scheduled or unscheduled maintenance.

6. The method of claim 1, wherein the new column is a first column, the function is a first function, and the timer is a first timer, further comprising:
   adding a second column to the table, wherein a second cell in the second column comprises a second timer and a second function set, wherein the second timer is set to expire at a different time than the first timer;
   upon expiration of the second timer, determining that the database management system is available for execution of the second function; and
   executing the second function on the particular row in the table.

7. The method of claim 6, wherein:
   the second timer is set to expire at a later time than the first timer;
   the first function comprises instructions to archive information in the particular row; and
   the second function comprises instructions to delete the information in the particular row.

8. A system, comprising:
   a memory; and
   a processing device, operatively coupled to the memory, the processing device to:
     receive a function to be applied to a particular row in a table within the database management system;
     add a new column to the table in response to receiving the function, wherein a new cell in the new column comprises a timer indicating a time that the processing device will call the function, and wherein the new cell references the function;

upon expiration of the timer, determine that the database management system is available for execution of the function based on operating resources of the database management system; and execute the function on the particular row in the table, wherein to execute the function the processing device is to send a notification to a client device that the information in the particular row requires one or more actions.

9. The system of claim 8, wherein the function comprises instructions to delete, archive, move, or compress information in the particular row.

10. The system of claim 8, wherein the function is to operate on a batch of rows whose respective timers have expired.

11. The system of claim 8, wherein to determine that the database management system is available for execution of the function, the processing device is to determine that the operating resources of the database management system are operating below a threshold level of operation.

12. The system of claim 11, wherein to determine that the database management system is available for execution of the function, the processing device is to further determine that the database management system is, at a time the timer expires, free from scheduled or unscheduled maintenance.

13. The system of claim 8, wherein the new column is a first column, the function is a first function, and the timer is a first timer, the processing device further to:
add a second column to the table, wherein a second cell in the second column comprises a second timer and a second function set, wherein the second timer is set to expire at a different time than the first timer;
upon expiration of the second timer, determine that the database management system is available for execution of the second function; and
execute the second function on the particular row in the table.

14. The system of claim 13, wherein:
the second timer is set to expire at a later time than the first timer;
the first function comprises instructions to archive information in the particular row; and
the second function comprises instructions to delete the information in the particular row.

15. A non-transitory computer-readable medium having instructions stored thereon that, when executed by a processing device, cause the processing device to:
receive, from a database management system, a function to be applied to a particular row in a table within the database management system;
add a new column to the table in response to receiving the function, wherein a new cell in the new column comprises a timer indicating a time that the processing device will call the function, and wherein the new cell references the function;
upon expiration of the timer, determine that the database management system is available for execution of the function based on operating resources of the database management system; and
execute the function on the particular row in the table, wherein to execute the function the processing device to send a notification to a client device that the information in the particular row requires one or more actions.

16. The non-transitory computer readable storage medium of claim 15, wherein the function comprises instructions to delete, archive, move, or compress information in the particular row.

17. The non-transitory computer readable storage medium of claim 15, wherein the function is to operate on a batch of rows whose respective timers have expired.

* * * * *